(12) United States Patent
Lin et al.

(10) Patent No.: US 10,222,581 B1
(45) Date of Patent: Mar. 5, 2019

(54) WIDE ANGLE LENS ASSEMBLY HAVING LOW DISTORTION

(71) Applicant: SUNNY OPTICAL OVERSEAS LIMITED, Taipei (TW)

(72) Inventors: Tzu-Yuan Lin, Taichung (TW); Sheng-Lung Lin, Taichung (TW); Leit Ho, Taichung (TW)

(73) Assignee: SUNNY OPTICAL OVERSEAS LIMITED, Taipei (TW)

( * ) Notice: Subject to any disclaimer, the term of this patent is extended or adjusted under 35 U.S.C. 154(b) by 0 days.

(21) Appl. No.: 15/714,107

(22) Filed: Sep. 25, 2017

(51) Int. Cl.
*G02B 13/06* (2006.01)
*G02B 9/58* (2006.01)
*G02B 13/00* (2006.01)
*G02B 27/00* (2006.01)

(52) U.S. Cl.
CPC ............ *G02B 9/58* (2013.01); *G02B 13/004* (2013.01); *G02B 13/06* (2013.01); *G02B 27/0025* (2013.01)

(58) Field of Classification Search
CPC ........ G02B 9/58; G02B 13/004; G02B 13/06; G02B 27/0025
USPC .......................................................... 359/782
See application file for complete search history.

(56) References Cited

U.S. PATENT DOCUMENTS

| | | | | |
|---|---|---|---|---|
| 2011/0157453 A1* | 6/2011 | Chen | ............... | G02B 13/004 348/340 |
| 2012/0113530 A1* | 5/2012 | Tsai | ............... | G02B 13/004 359/715 |

* cited by examiner

*Primary Examiner* — James Greece
(74) *Attorney, Agent, or Firm* — Lynette Wylie; Apex Juris, pllc

(57) ABSTRACT

A wide angle lens assembly having low distortion including, in order from an object side to an image plane, a first lens, which is of a meniscus shape having an object side surface being convex and an image side surface being concave, having negative refractive power; a second lens having positive refractive power; a third lens having positive refractive power, and a fourth lens having negative refractive power; the wide angle lens assembly satisfies the following condition: −0.6<f34/f12<−0.4; wherein f12 is a composite focal length of the first lens and the second lens, and f34 is a composite focal length of the third lens and the fourth lens.

17 Claims, 9 Drawing Sheets

WIDE ANGLE LENS ASSEMBLY HAVING LOW DISTORTION

BACKGROUND OF THE INVENTION

1. Technical Field

The present invention is related to an optical lens, and more particularly to a wide angle lens assembly having low distortion which can be applied to both wavebands of the visible light and the infrared ray.

2. Description of Related Art

With the development of the electronic device technology, such as CCD and CMOS, the application of the image capturing lens is more and more widely. The image capturing lens is not only applied to the camera system, but also began to be utilized in other types of video capturing environment. For example, the need for image capturing lens applicable to infrared ray waveband is also getting increased. Thus, the ordinary image capturing lens which can only receive the visible light are not able to meet the demand.

For example, it has been widely used in the surveillance system for capturing the images from the surrounding environment, or in the vehicles or the aircraft to secure the safety of their motion so as to avoid the damage of collision with human or other objects.

However, the conventional day-night dual-purpose wide angle lens assemblies usually have drawbacks of a heavy weight, a high material and manufacturing cost and a large size. Besides, the conventional low distortion lens assemblies, such as the lens for mobile phone, usually have a shortcoming of a small angle of view. Therefore, there is a need for the manufacturers to develop a solution capable of reducing the weight, lowering the manufacturing cost and enabling the miniaturization of the lens assembly.

BRIEF SUMMARY OF THE INVENTION

In view of the above, an object of the present invention is to provide a wide angle lens assembly having low distortion which can be made with a small size, low manufacturing cost and a wide angle of view, and be applicable to both wavebands of the visible light and the infrared ray.

Therefore, the present invention provides a wide angle lens assembly having low distortion which includes, in order from an object side to an image plane, a first lens, which is of a meniscus shape having an object side surface being convex and an image side surface being concave, having negative refractive power; a second lens having positive refractive power; a third lens having positive refractive power, and a fourth lens having negative refractive power; the wide angle lens assembly satisfies the following condition:

$$-0.6 < f34/f12 < -0.4;$$

wherein, f12 is a composite focal length of the first lens and the second lens, and f34 is a composite focal length of the third lens and the fourth lens.

The present invention provides an advantage in that the wide angle lens assembly can have a wide angle of view, low astigmatism, and be applicable to both wavebands of the visible light and the infrared ray through the design of the optical configuration and the distribution of the refractive powers of the lenses.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
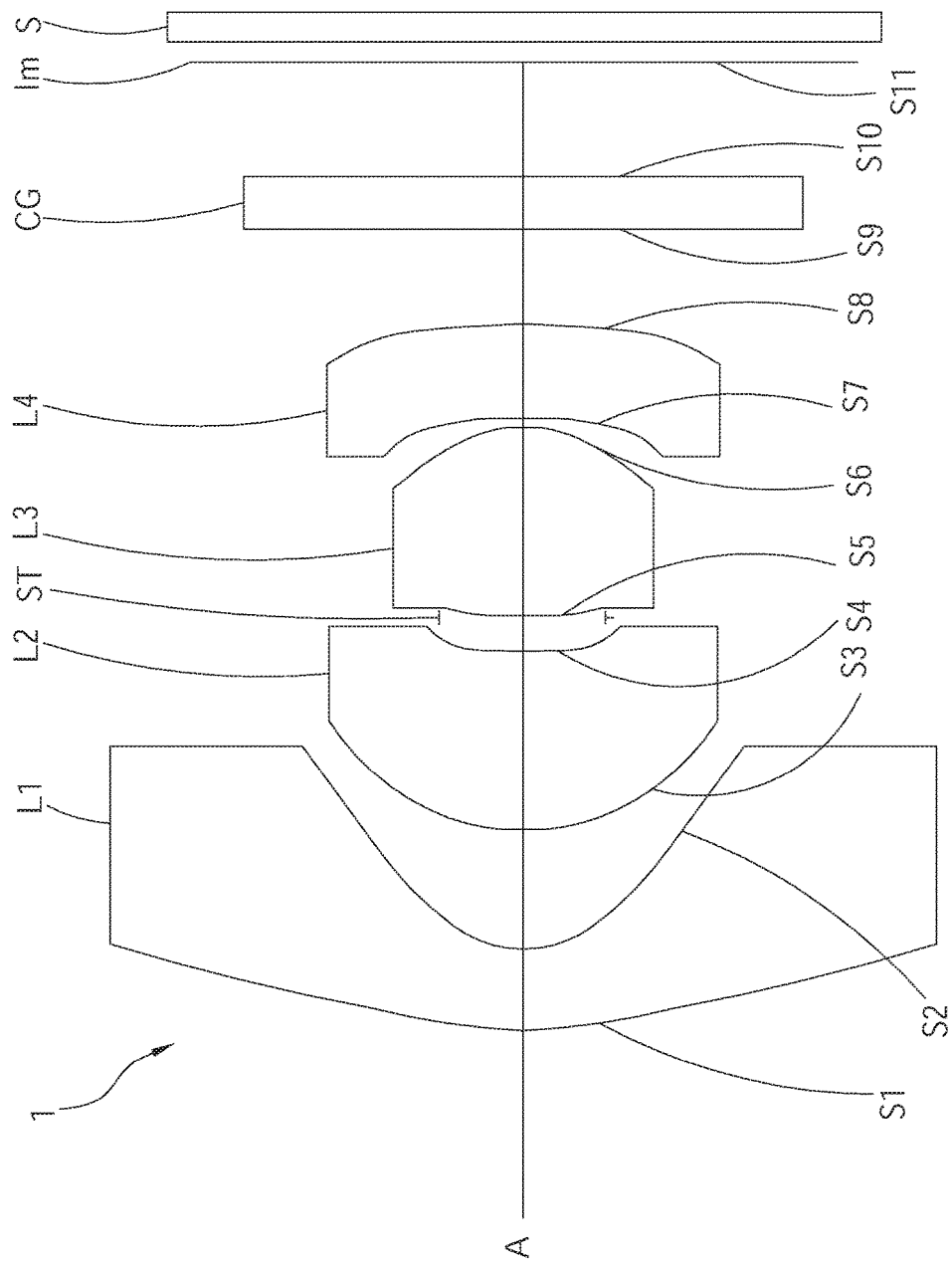
FIG. 1 is a schematic view of a wide angle lens assembly having low distortion of a first embodiment according to the present invention.

The following illustrative embodiments and drawings are provided to illustrate the disclosure of the present invention, these and other advantages and effects can be clearly understood by persons skilled in the art after reading the disclosure of this specification. As shown in FIG. 1, a wide angle lens assembly 1 having low distortion according to a first embodiment of the present invention includes, in order from an object side to an image plane Im, a first lens L1, a second lens L2, a third lens L3 and a fourth lens L4. The wide angle lens assembly 1 further can include an image sensor S disposed on the image plane Im. Additionally, a filter CG can be disposed between the fourth lens L4 and the image plane Im to filter out noise light signal and thereby to improve the optical efficiency of the wide angle lens assembly.

The first lens L1 may be of a meniscus shape with negative refractive power having an object side surface S1 being convex and an image side surface S2 being concave, so as to reduce the astigmatism of the wide angle lens assembly.

The second lens L2 may have positive refractive power. Preferably, in this embodiment, the second lens L2 is of a meniscus shape having an object side surface S3 being convex and an image side surface S4 being concave.

The third lens L3 may have positive refractive power. Preferably, in this embodiment, the third lens L3 is a biconvex lens having an object surface S5 and an image side surface S6 are both convex shapes.

The fourth lens L4 may have negative refractive power. Preferably, in this embodiment, the fourth lens L4 is of a meniscus shape having an object side surface S7 being concave and an image side surface S8 being convex.

Preferably, the wide angle lens assembly 1 satisfies the following condition:

(1) $-0.6 < f34/f12 < -0.4°$ wherein, f12 is a composite focal length of the first lens L1 and the second lens L2, and f34 is a composite focal length of the third lens L3 and the fourth lens L4.

With the configuration design of the wide angle lens assembly 1 and the distribution of the refractive power of each of the lens thereof, together with the composite focal length of the first and the second lenses, and the composite focal length of the third and the fourth lenses shown in the above condition (1), the wide angle lens assembly 1 of the present invention can have a wide angle of view and low optical aberration. Meanwhile, the wide angle lens assembly 1 of the present invention fulfills the performance requirement of capturing wavebands of the visible light and the infrared ray and enables the feasibility of manufacturing dual wavebands of the visible light and the infrared ray lens assembly.

Additionally, in one embodiment, the wide angle lens assembly 1 may further include a stop ST disposed between the second lens L2 and the third lens L3, so as to reduce stray light and favorably increase the optical imaging quality thereof. Preferably, in this embodiment, the stop ST may be disposed on the object side surface S5 of the third lens L3, but it is not limited thereto. Alternatively, in one embodiment, the stop ST may be located at a predetermined distance from the second lens L2 and the third lens L3.

In addition, preferably, the wide angle lens assembly 1 further satisfies the following condition:

(2) $0.2 < ImH/(f*TTL) < 0.6$;
(3) $Nd4 > 1.6$; $Vd4 < 25$;
(4) at least one surface of at least one of the first lens L1, the second lens L2, the third lens L3 and the fourth lens L4 is aspheric;
(5) at least one of the first lens L1, the second lens L2, the third lens L3 and the fourth lens L4 is made of plastic material.

wherein, half of a diagonal length of an effective sensing area of the image sensor S is ImH; the composite focal length of the first lens L1 to the fourth lens L4, i.e., a focal length of the wide angle lens assembly 1 is f; a distance on the optical axis A between the object side surface S1 of the first lens L1 to the image plane Im, i.e., the total track length of the wide angle lens assembly 1 is TTL; a refractive index of the fourth lens L4 is Nd4; an abbe number of the fourth lens L4 is Vd4.

When the wide angle lens assembly 1 of the present invention is configured with the condition (2) listed above, the optical performance thereof can be optimized, such as the wide angle of view can be favorably enlarged, and the optical aberration thereof can be reduced.

Meanwhile, with the optical design listed in the above condition (3) regarding the refractive index Nd4 and the abbe number Vd4 of the fourth lens L4, the longitudinal chromatic aberration of the wide angle lens assembly 1 can be further minimized. In other words, the optical performance of the wide angle lens assembly 1 can be favorably balanced in the wavebands of the visible light and the infrared ray.

In addition, with the aspheric design on the lens surface as listed in the above condition (4), the aberration of the wide angle lens assembly 1 can be lowered and the number of the lens elements can be reduced so as to minimize the total track length thereof.

Preferably, in this embodiment, all of the object side surfaces and the image side surfaces of the first lens L1, the second lens L2, the third lens L3 and the fourth lens L4 are aspheric, thereby minimizing the total track length of the wide angle lens assembly 1 so as to enable the miniaturization of the lens assembly.

Further, with the design on the lens material as listed in the above condition (5), a lens made of plastic material can reduce a total weight of the lens assembly and a material cost thereof. Preferably, in this embodiment, all of the first lens L1, the second lens L2, the third lens L3 and the fourth lens 4 are made of plastic material such that the total track of the wide angle lens assembly 1 can be favorably reduced and the manufacturing cost thereof can be lowered.

The parameters of the lenses of the wide angle lens assembly 1 of the first embodiment according to the present invention are shown in Table 1. Wherein, f12=−2.41 mm; f34=0.99 mm; ImH=1.38 mm; f=0.88 mm; TTL=3.95 mm; the units of the curvature radius, the thickness, the distance and the focal length are expressed in mm; surfaces 0 to S11 respectively represents the surfaces of the lenses in order from the object side to the image plane.

TABLE 1

Embodiment 1

|  | Surface # | Radius of curvature (mm) | Thickness (mm) | Material | Refractive index, Nd | Abbe number, Vd | Focal Length (mm) |
|---|---|---|---|---|---|---|---|
| Object | 0 | Plano | Infinity |  |  |  |  |
| L1 | S1 | 1.16676(ASP) | 0.352 | plastic | 1.53 | 57.1 | −1.103 |
|  | S2 | 0.35139(ASP) | 0.469 |  |  |  |  |
| L2 | S3 | 0.87530(ASP) | 0.734 | plastic | 1.64 | 24.0 | 2.061 |
|  | S4 | 1.74878(ASP) | 0.140 |  |  |  |  |
| L3(Stop) | S5 | 1.84256(ASP) | 0.800 | plastic | 1.53 | 57.1 | 0.785 |
|  | S6 | −0.46371(ASP) | 0.040 |  |  |  |  |
| L4 | S7 | −1.47175(ASP) | 0.339 | plastic | 1.64 | 24.0 | −3.454 |
|  | S8 | −4.79403(ASP) | 0.393 |  |  |  |  |
|  | S9 | Infinity | 0.210 |  | 1.52. | 64.2 | — |
| CG | S10 | Plano | 0.474 |  |  |  |  |
| Image | S11 | Plano | — |  |  |  |  |

The aspheric coefficients of the lenses of the wide angle lens assembly 1 of the first embodiment according to the present invention are shown in Table 2. Wherein, K is the conic coefficient of the equation of the aspheric surface profile; A4 to A16 are aspheric coefficients of each of the surfaces of the lenses.

TABLE 2

Aspheric Coefficients

| Surface # | S1 | S2 | S3 | S4 |
|---|---|---|---|---|
| K = | −6.0257E−01 | −1.0187E+00 | −5.9470E+00 | 1.1281E+01 |
| A4 = | −7.3440E−01 | −7.9665E−01 | 9.5613E−01 | 8.5322E−01 |
| A6 = | 9.2208E−01 | −9.9030E−01 | −2.1429E+00 | 3.3513E+00 |
| A8 = | −7.7835E−01 | 9.3919E+00 | 6.5476E+00 | −6.7214E+01 |
| A10 = | 4.1580E−01 | −1.5909E+01 | −1.0019E+01 | 2.0551E+03 |
| A12 = | −1.3731E−01 | 8.0143E+00 | 5.2954E+00 | −2.5578E+04 |
| A14 = | 2.5408E−02 | 7.6039E−02 | 5.1722E+00 | 1.5381E+05 |
| A16 = | −2.0216E−03 | −1.3621E−03 | −6.4178E+00 | −3.3163E+05 |

| Surface # | S5 | S6 | S7 | S8 |
|---|---|---|---|---|
| K = | 2.7850E+01 | −7.9869E+00 | 0.0000E+00 | 6.4008E+00 |
| A4 = | −1.4556E+00 | −4.4442E+00 | 2.0984E+00 | −1.9992E−01 |
| A6 = | 1.1211E+02 | 3.4787E+01 | −2.7240E+01 | 5.0878E−01 |
| A8 = | −4.5985E+03 | −2.3801E+02 | 2.0947E+02 | −2.2799E+00 |
| A10 = | 9.9657E+04 | 1.0763E+03 | −1.0864E+03 | 5.1787E+00 |
| A12 = | −1.2002E+06 | −2.8827E+03 | 3.3951E+03 | −8.7345E+00 |
| A14 = | 7.5293E+06 | 3.7756E+03 | −5.8259E+03 | 8.5781E+00 |
| A16 = | −1.9381E+07 | −1.2110E+03 | 4.0892E+03 | −3.7069E+00 |

Figure 2:
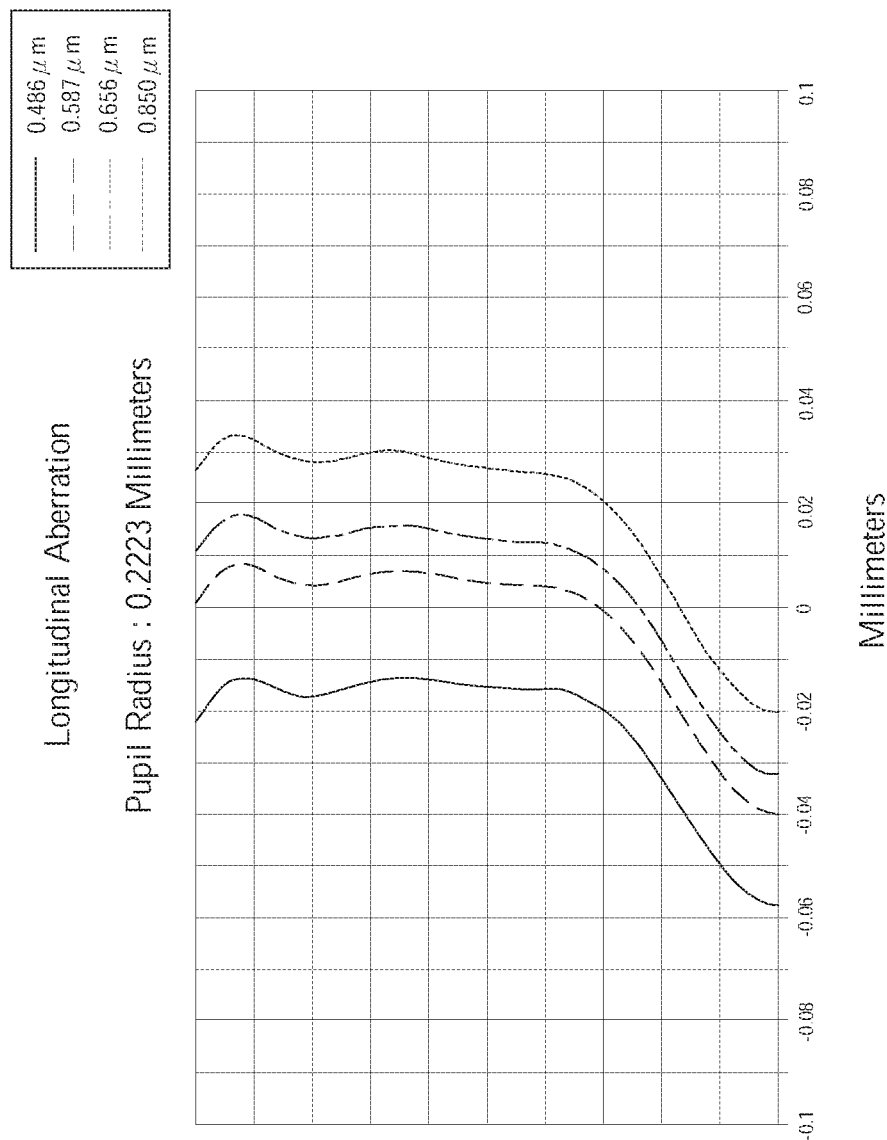
FIG. 2 is a diagram showing a longitudinal spherical aberration of the wide angle lens assembly of the first embodiment according to the present invention.

FIG. 2 is a diagram showing a longitudinal spherical aberration of the wide angle lens assembly having low distortion of the first embodiment according to the present invention. As shown in FIG. 2, the longitudinal spherical aberration of the lens assembly corresponding to the light having wavelengths of 0.486 μm, 0.587 μm, 0.656 μm and 0.850 μm is within a range of −0.06 mm to 0.04 mm. Hence, in this embodiment, the longitudinal spherical aberration of the lens assembly is improved.

Figure 3:
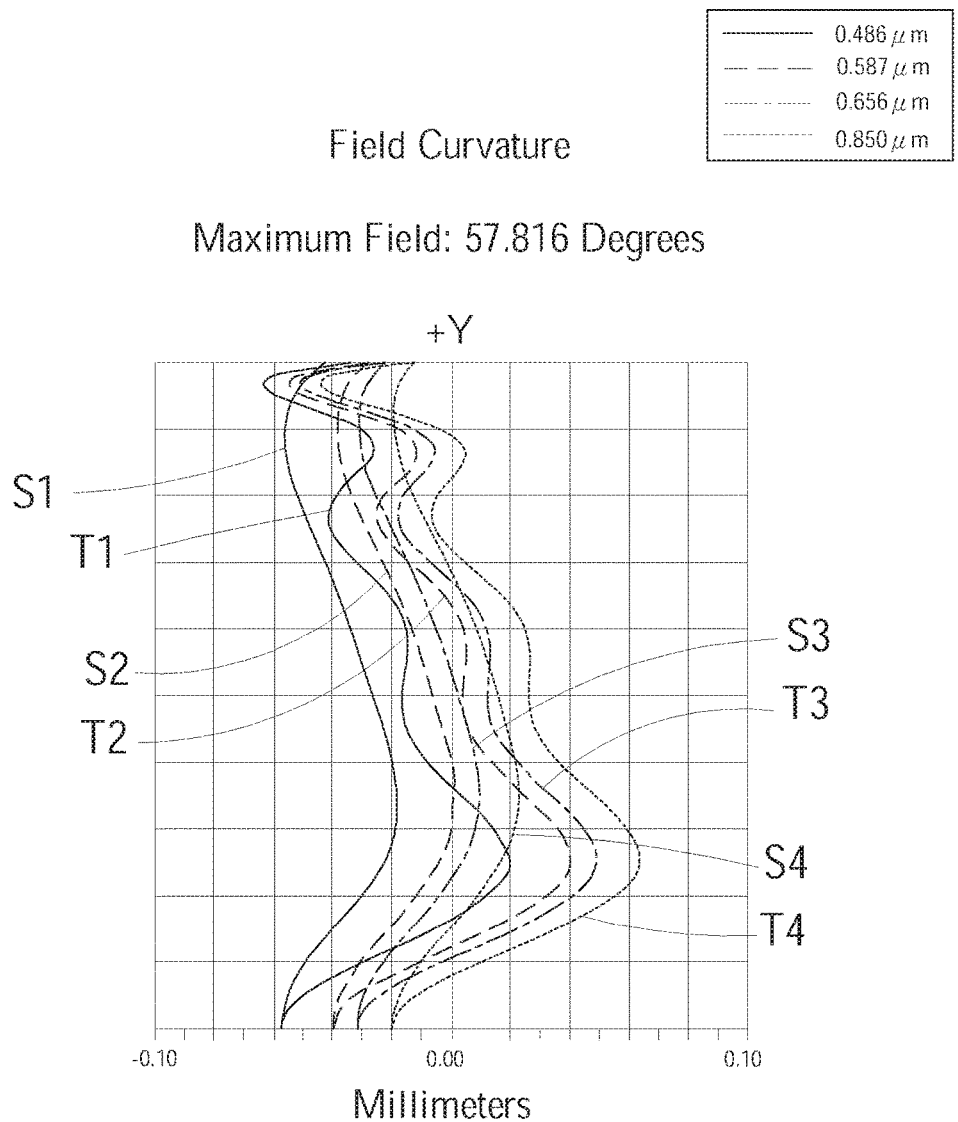
FIG. 3 is a diagram showing astigmatic field curves of the wide angle lens assembly of the first embodiment according to the present invention.

FIG. 3 is a diagram showing astigmatic field curves of the wide angle lens assembly having low distortion of the first embodiment according to the present invention. As shown in FIG. 3, the field curvature of the lens assembly corresponding to the light having wavelengths of 0.486 μm, 0.587 μm, 0.656 μm and 0.850 μm in the tangential direction and the sagittal direction is respectively within a range of −0.07 mm to 0.07 mm. Hence, in this embodiment, the astigmatic can be effectively corrected.

Figure 4:
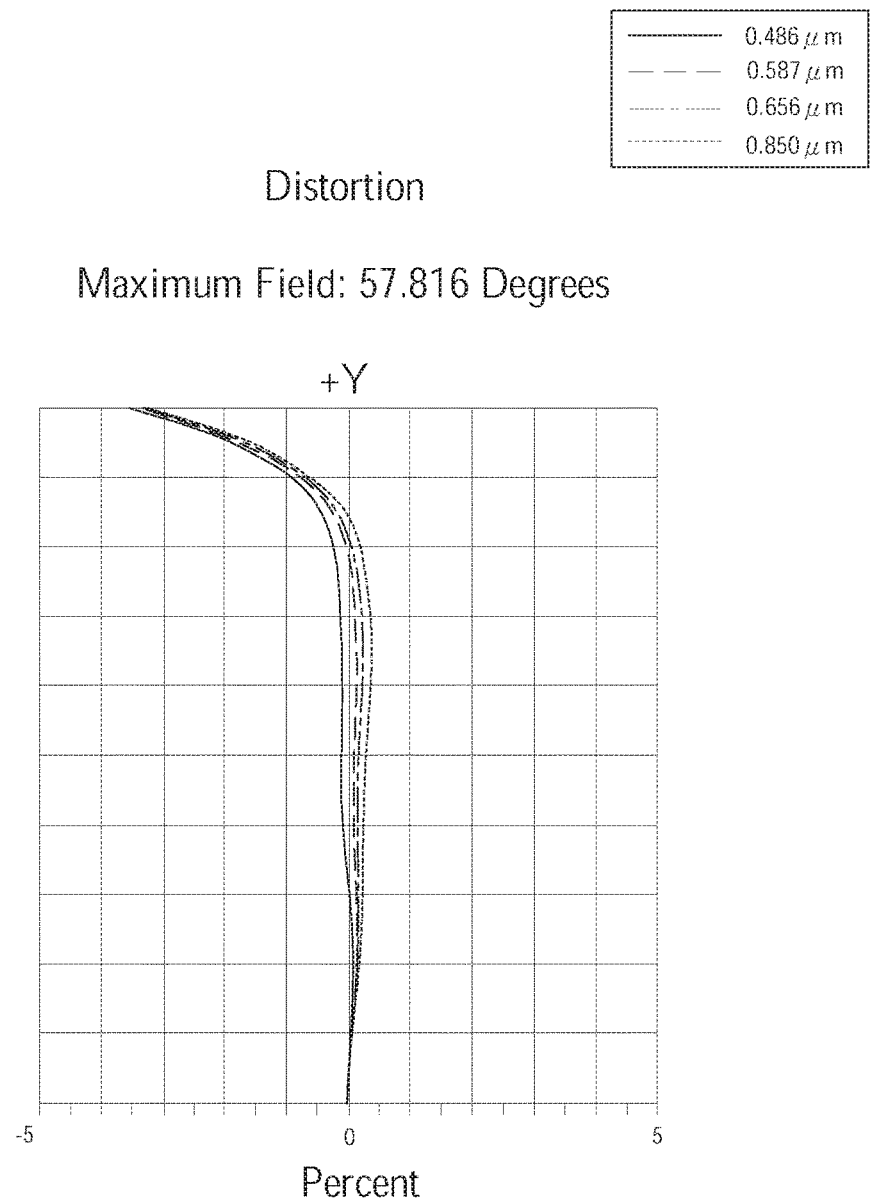
FIG. 4 is a diagram showing distortion of the wide angle lens assembly of the first embodiment according to the present invention.

FIG. 4 is a diagram showing distortion of the wide angle lens assembly having low distortion of the first embodiment according to the present invention. As shown in FIG. 4, the distortion of the lens assembly corresponding the light having wavelengths of 0.486 μm, 0.587 μm, 0.656 μm and 0.850 μm is between −3.5% to 0.5%. Hence, the distortion of the lens assembly of this embodiment can be effectively corrected.

Figure 5:
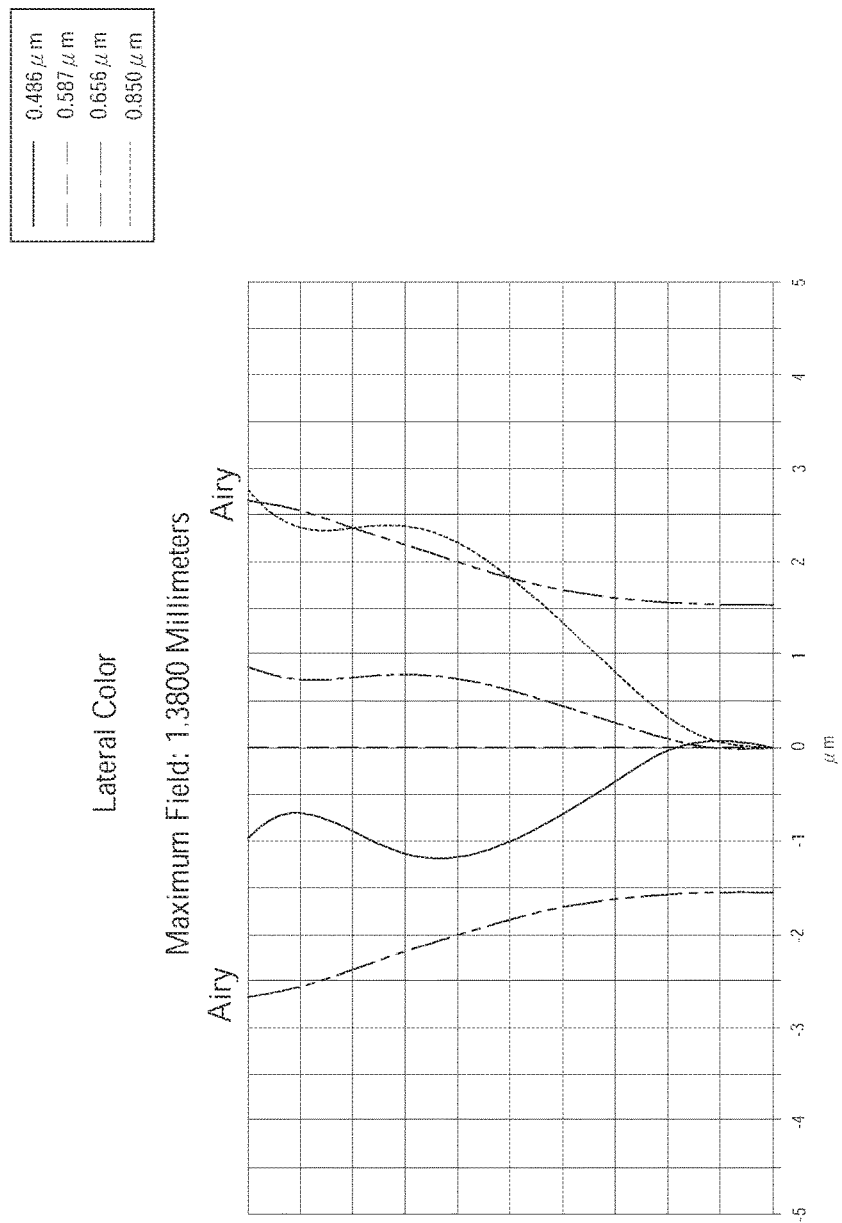
FIG. 5 is a diagram showing lateral color aberration of the wide angle lens assembly of the first embodiment according to the present invention.

FIG. 5 is a diagram showing lateral color aberration of the wide angle lens assembly having low distortion of the first embodiment according to the present invention. As shown in FIG. 5, the lateral color aberration of the lens assembly corresponding to the light having wavelengths of 0.486 μm, 0.587 μm, 0.656 μm and 0.850 μm is generally within the range of the Airy disk radius. Hence, the lateral color aberration of the lens assembly of this embodiment can be effectively corrected.

Hereinafter, a wide angle lens assembly having low distortion of a second embodiment according to the present invention will be described. The configuration of the wide angle lens assembly of the second embodiment is substantially the same with the wide angle lens assembly 1 of the first embodiment. Therefore, the configuration of the wide angle lens assembly of the second embodiment can be also referred to FIG. 1. Besides, the wide angle lens assembly of the second embodiment is different from that of the first embodiment in that the parameters of the lenses are different. The parameters of the lenses of the lens assembly of the second embodiment are shown in Table 3. Wherein, f12=−2.28 mm; f34=1.01 mm; ImH=1.38 mm; f=0.89 mm; TTL=3.99 mm; the units of the curvature radius, the thickness, the distance and the focal length are expressed in mm; surfaces 0 to S11 respectively represents the surfaces of the lenses in order from the object side to the image plane.

TABLE 3

Embodiment 2

| | Surface # | Radius of curvature (mm) | Thickness (mm) | Material | Refractive index, Nd | Abbe number, Vd | Focal Length (mm) |
|---|---|---|---|---|---|---|---|
| Object | 0 | Plano | Infinity | | | | |
| L1 | S1 | 1.16675(ASP) | 0.326 | plastic | 1.53 | 57.1 | −1.112 |
| | S2 | 0.35633(ASP) | 0.499 | | | | |
| L2 | S3 | 0.90283(ASP) | 0.735 | plastic | 1.64 | 24.0 | 2.205 |
| | S4 | 1.70853(ASP) | 0.145 | | | | |
| L3(Stop) | S5 | 1.73625(ASP) | 0.791 | plastic | 1.53 | 57.1 | 0.795 |
| | S6 | −0.47580(ASP) | 0.040 | | | | |
| L4 | S7 | −1.56760(ASP) | 0.381 | plastic | 1.66 | 20.4 | −3.303 |
| | S8 | −5.96258(ASP) | 0.391 | | | | |
| | S9 | Infinity | 0.210 | | 1.52. | 64.2 | — |
| CG | S10 | Plano | 0.472 | | | | |
| Image | S11 | Plano | — | | | | |

The aspheric coefficients of the lenses of the wide angle lens assembly 1 of the first embodiment according to the present invention are shown in Table 4. Wherein, K is the conic coefficient of the equation of the aspheric surface profile; A4 to A16 are aspheric coefficients of each of the surfaces of the lenses.

TABLE 4

Aspheric Coefficients

| Surface # | S1 | S2 | S3 | S4 |
|---|---|---|---|---|
| K = | −6.0038E−01 | −1.0163E+00 | −5.0061E+00 | 1.0904E+01 |
| A4 = | −7.6289E−01 | −7.9201E−01 | 7.5244E−01 | 3.1497E−01 |
| A6 = | 9.8141E−01 | −9.9159E−01 | −1.3187E+00 | 3.0847E+01 |
| A8 = | −8.4052E−01 | 9.4626E+00 | 4.5975E+00 | −7.1437E+02 |
| A10 = | 4.5311E−01 | −1.5993E+01 | −7.5426E+00 | 1.0523E+04 |
| A12 = | −1.5037E−01 | 8.0143E+00 | 5.0493E+00 | −8.9129E+04 |
| A14 = | 2.7878E−02 | 7.6039E−02 | 3.3114E−01 | 4.1121E+05 |
| A16 = | −2.2167E−03 | −1.3621E−03 | −1.6226E+00 | −7.7035E+05 |

TABLE 4-continued

Aspheric Coefficients

| Surface # | S5 | S6 | S7 | S8 |
|---|---|---|---|---|
| K = | 2.5295E+01 | −7.7218E+00 | 8.4726E−01 | 2.9742E+00 |
| A4 = | −1.0091E+00 | −4.5655E+00 | 1.6621E+00 | −1.6859E−01 |
| A6 = | 8.0493E+01 | 3.8754E+01 | −2.1368E+01 | 3.9612E−01 |
| A8 = | −3.5345E+03 | −2.8694E+02 | 1.6348E+02 | −2.6795E+00 |
| A10 = | 8.0237E+04 | 1.4305E+03 | −8.6643E+02 | 9.1098E+00 |
| A12 = | −1.0108E+06 | −4.3222E+03 | 2.7889E+03 | −1.8788E+01 |
| A14 = | 6.6331E+06 | 6.8043E+03 | −4.9683E+03 | 1.9589E+01 |
| A16 = | −1.7957E+07 | −3.6866E+03 | 3.5934E+03 | −8.1577E+00 |

FIG. 6 to FIG. 9 are diagrams showing longitudinal spherical aberration, astigmatic field curves, distortion, and lateral color aberration of the wide angle lens assembly having low distortion of the first embodiment according to the present invention.

Figure 6:
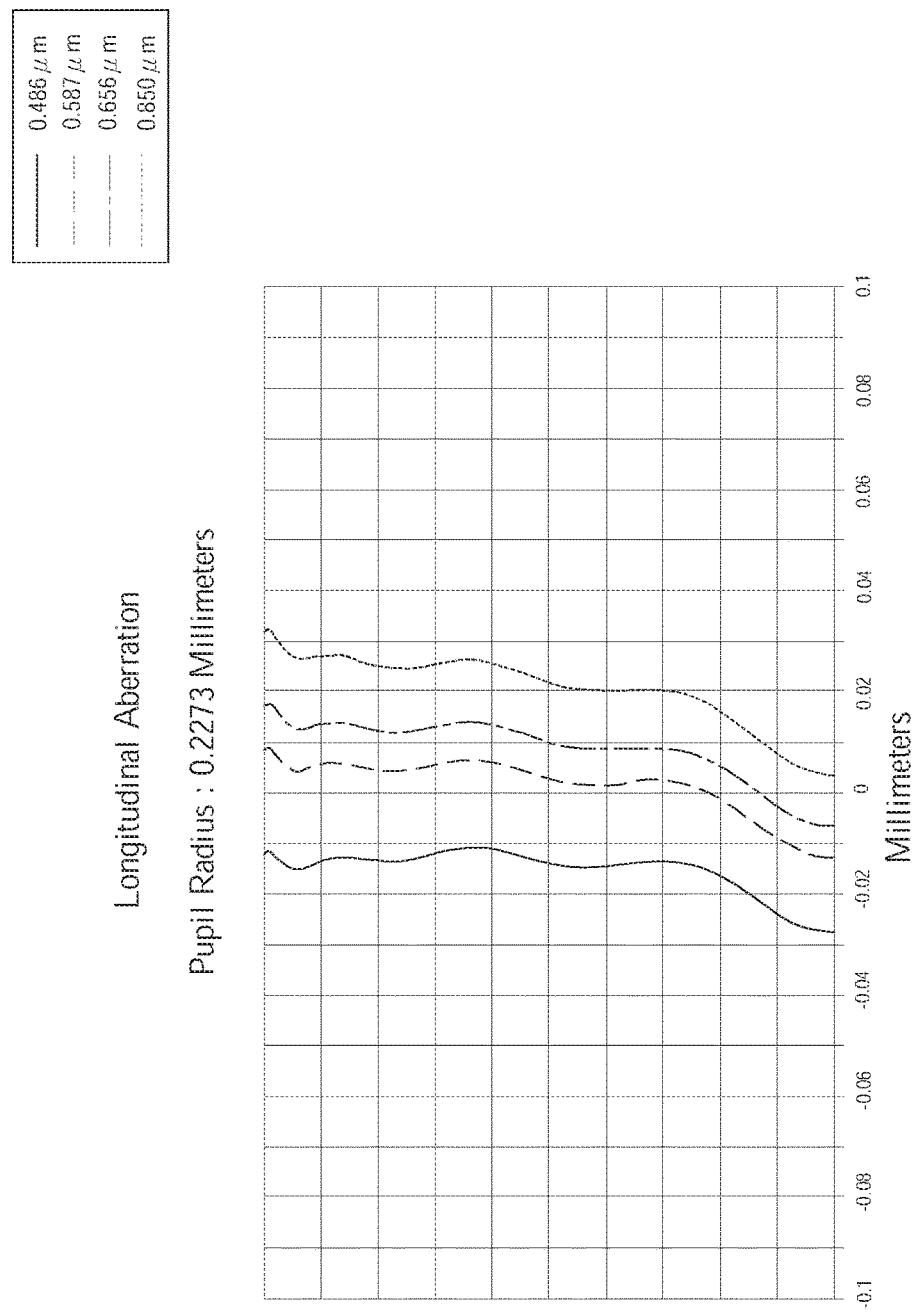
FIG. 6 is a diagram showing a longitudinal spherical aberration of a wide angle lens assembly of a second embodiment according to the present invention.

Wherein, as shown in FIG. 6, the longitudinal spherical aberration of the lens assembly corresponding to the light having wavelengths of 0.486 μm, 0.587 μm, 0.656 μm and 0.850 μm is within a range of −0.03 mm to 0.04 mm. Hence, in the second embodiment, the longitudinal spherical aberration of the lens assembly is improved.

Figure 7:
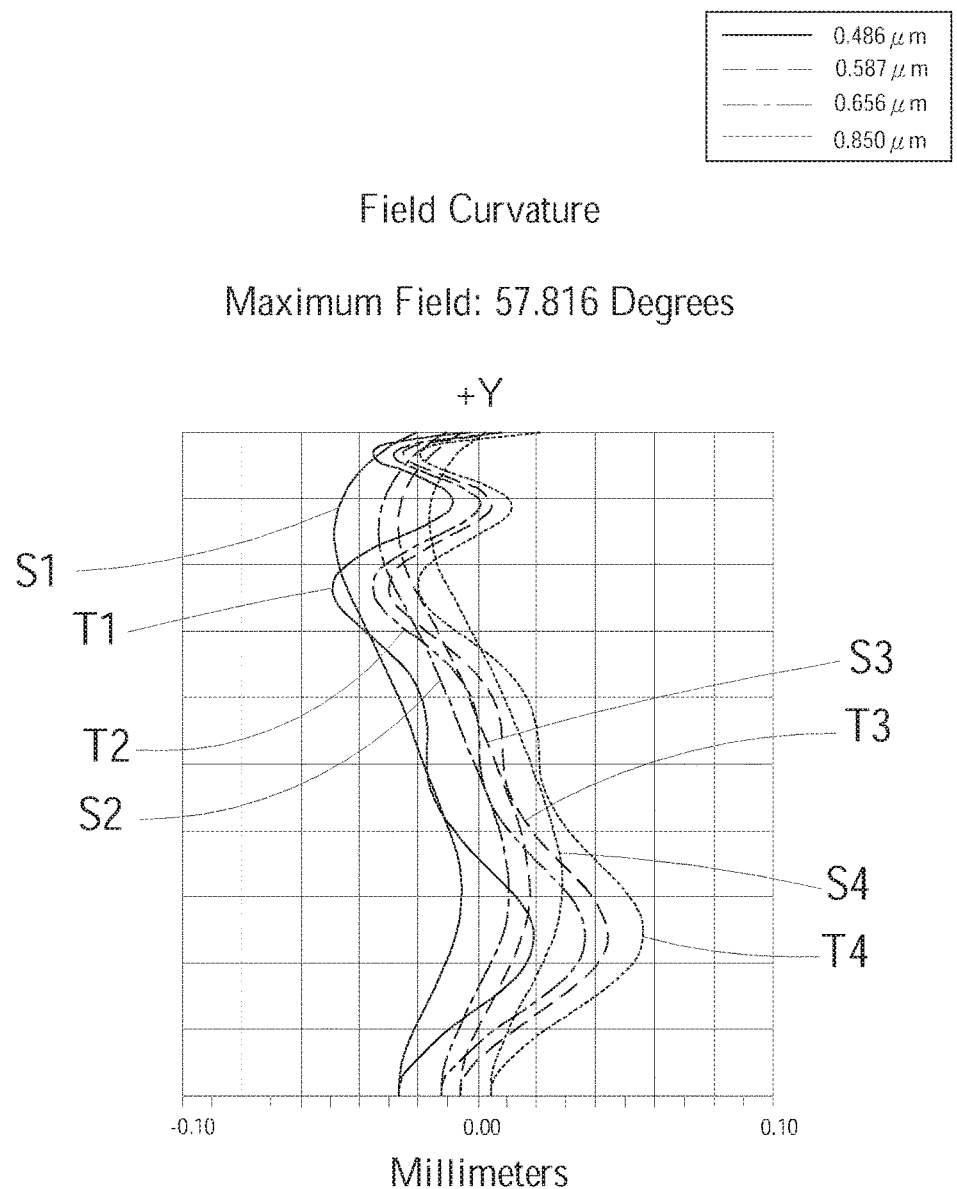
FIG. 7 is a diagram showing astigmatic field curves of the wide angle lens assembly of the second embodiment according to the present invention.

As shown in FIG. 7, the field curvature of the lens assembly corresponding to the light having wavelengths of 0.486 μm, 0.587 μm, 0.656 μm and 0.850 μm in the tangential direction and the sagittal direction is respectively within a range of −0.06 mm to 0.06 mm. Hence, in this embodiment, the astigmatic can be effectively corrected.

Figure 8:
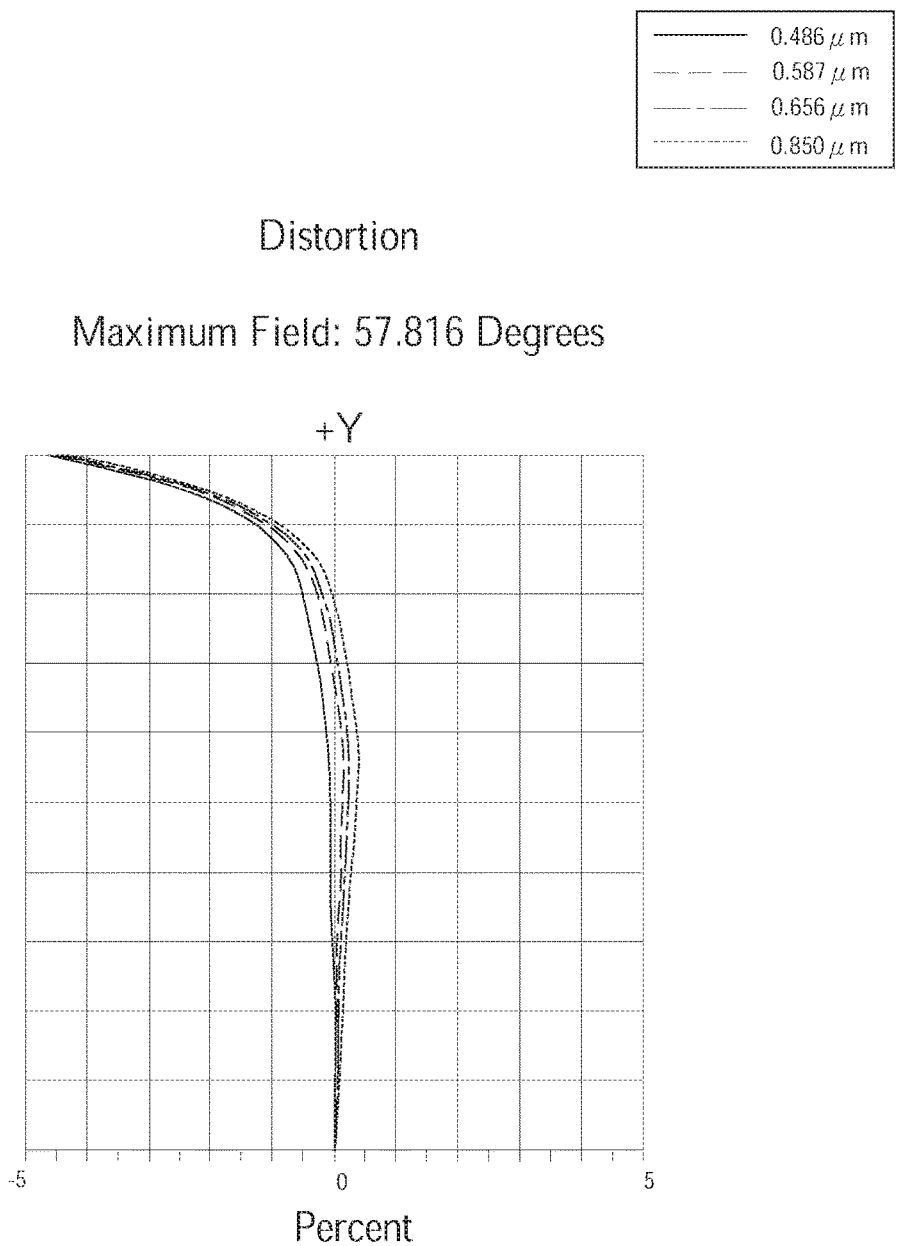
FIG. 8 is a diagram showing distortion of the wide angle lens assembly of the second embodiment according to the present invention.

As shown in FIG. 8, the distortion of the lens assembly corresponding the light having wavelengths of 0.486 μm, 0.587 μm, 0.656 μm and 0.850 μm is between −5% and 0.5%. Hence, the distortion of the lens assembly of this embodiment can be effectively corrected.

Figure 9:
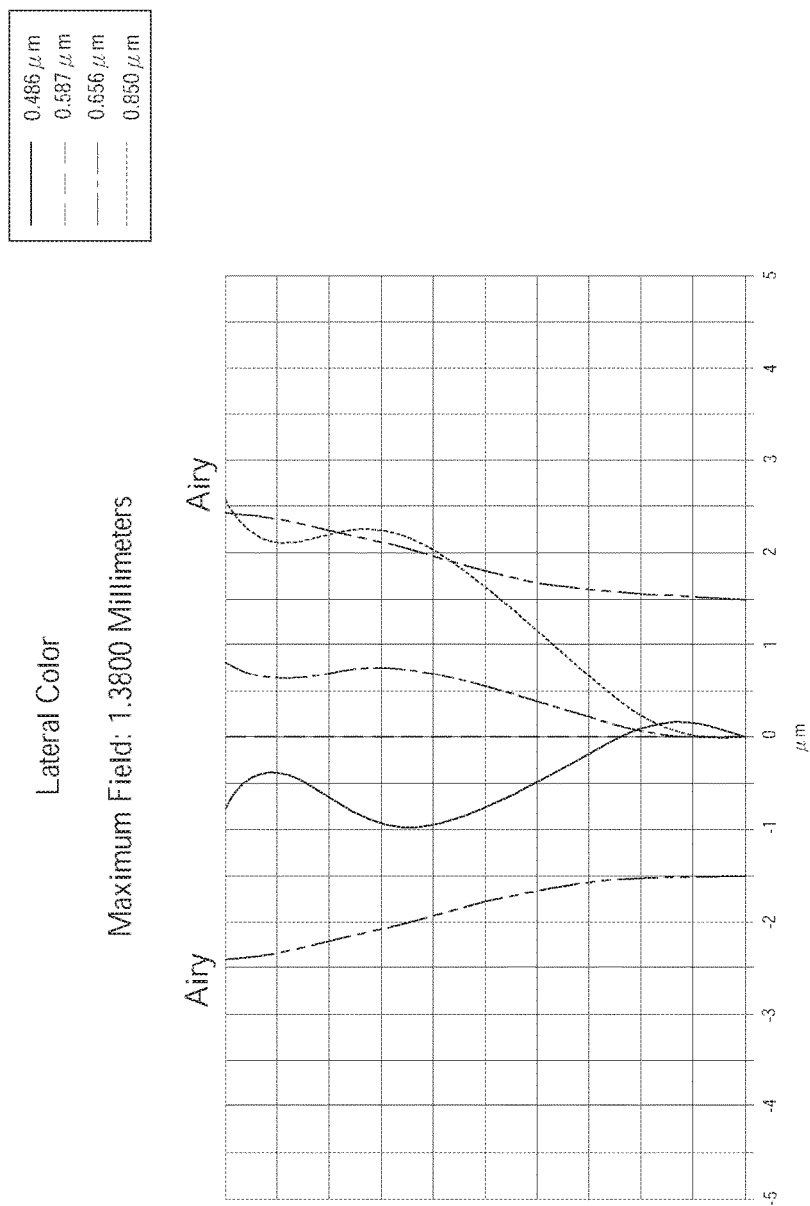
FIG. 9 is a diagram showing lateral color aberration of the wide angle lens assembly of the second embodiment according to the present invention.

As shown in FIG. 9, the lateral color aberration of the lens assembly corresponding to the light having wavelengths of 0.486 μm, 0.587 μm, 0.656 μm and 0.850 μm is generally within the range of the Airy disk radius. Hence, the lateral color aberration of the lens assembly of this embodiment can be effectively corrected.

To sum up, with the configuration of the lens shapes and the refractive powers of the lenses, the present invention can provide a wide angle lens assembly which has a wide angle of view, low astigmatism and low distortion, thereby enabling the extensive application on dual wavebands of the visible light and the infrared ray.

It must be pointed out that the embodiments described above are only some embodiments of the present invention. All equivalent structures which employ the concepts disclosed in this specification and the appended claims should fall within the scope of the present invention.

What is claimed is:

1. A wide angle lens assembly having low distortion, comprising, in order from an object side to an image plane:
a first lens, which is of a meniscus shape having an object side surface being convex and an image side surface being concave, having negative refractive power;
a second lens having positive refractive power;
a third lens having positive refractive power; and
a fourth lens having negative refractive power;
the wide angle lens assembly satisfies the following condition:

$-0.6 < f34/f12 < -0.4$;

wherein, f12 is a composite focal length of the first lens and the second lens, and f34 is a composite focal length of the third lens and the fourth lens;
wherein the wide angle lens assembly further comprises an image sensor disposed on the image plane, and satisfies the following condition:

$0.2 < ImH/(f*TTL) < 0.6$;

wherein, ImH is half of a diagonal length of an effective sensing area of the image sensor S; f is a composite focal length of the first lens to the fourth lens; TTL is a distance on an optical axis of the wide angle lens assembly between the object side surface of the first lens to the image plane.

2. The wide angle lens assembly of claim 1, wherein at least one surface of at least one of the first lens, the second lens, the third lens and the fourth lens is aspheric.

3. The wide angle lens assembly of claim 2, wherein all of the object side surfaces and the image side surfaces of the first lens, the second lens, the third lens and the fourth lens are aspheric.

4. The wide angle lens assembly of claim 1, wherein the wide angle lens assembly satisfies the following condition:

$Nd4 > 1.6$; $Vd4 < 25$;

wherein, Nd4 is a refractive index of the fourth lens; Vd4 is an abbe number of the fourth lens.

5. The wide angle lens assembly of claim 1, further comprising a stop disposed between the second lens and the third lens.

6. The wide angle lens assembly of claim 5, wherein the stop is disposed on the object side surface of the third lens.

7. The wide angle lens assembly of claim 1, wherein at least one of the first lens, the second lens, the third lens and the fourth lens is made of plastic material.

8. The wide angle lens assembly of claim 7, wherein all of the first lens, the second lens, the third lens and the fourth lens are made of plastic material.

9. The wide angle lens assembly of claim 1, wherein an object side surface of the second lens is convex.

10. The wide angle lens assembly of claim 9, wherein an image side surface of the second lens is concave.

11. The wide angle lens assembly of claim 1, wherein the second lens is of a meniscus shape having an object side surface being convex and an image side surface being concave.

12. The wide angle lens assembly of claim 1, wherein an object side surface of the third lens is convex.

13. The wide angle lens assembly of claim 1, wherein an image side surface of the third lens is convex.

14. The wide angle lens assembly of claim 1, wherein the third lens is a biconvex lens.

15. The wide angle lens assembly of claim 1, wherein an image side surface of the fourth lens is convex.

16. The wide angle lens assembly of claim 15, wherein an object side surface of the fourth lens is concave.

17. The wide angle lens assembly of claim 1, wherein the fourth lens is of a meniscus shape having an object side surface being concave and an image side surface being convex.

* * * * *